United States Patent
Kawamoto (10) Patent No.: US 8,040,658 B2
(45) Date of Patent: Oct. 18, 2011

(54) SEMICONDUCTOR CERAMIC POWDER, SEMICONDUCTOR CERAMIC, AND MONOLITHIC SEMICONDUCTOR CERAMIC CAPACITOR

(75) Inventor: Mitsutoshi Kawamoto, Otsu (JP)

(73) Assignee: Murata Manufacturing Co., Ltd., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 12/644,498

(22) Filed: Dec. 22, 2009

(65) Prior Publication Data
US 2010/0103587 A1    Apr. 29, 2010

Related U.S. Application Data

(63) Continuation of application No. PCT/JP2008/060847, filed on Jun. 13, 2008.

(30) Foreign Application Priority Data

Jun. 27, 2007  (JP) ................................. 2007-168530

(51) Int. Cl.
*H01G 4/06*    (2006.01)
(52) U.S. Cl. ............... 361/321.1; 361/321.2; 361/306.1; 361/306.3; 361/311; 361/313
(58) Field of Classification Search ............... 361/321.1, 361/321.2, 301.2, 301.4, 321.4, 311–313, 361/306.1, 306.3; 501/138, 139
See application file for complete search history.

(56) References Cited

U.S. PATENT DOCUMENTS

| | | | |
|---|---|---|---|
| 6,437,969 B2* | 8/2002 | Mizuno et al. | 361/311 |
| 7,528,088 B2* | 5/2009 | Umeda et al. | 501/139 |
| 7,583,493 B2* | 9/2009 | Tani et al. | 361/321.4 |
| 7,872,854 B2* | 1/2011 | Kawamoto | 361/321.1 |

FOREIGN PATENT DOCUMENTS

| | | |
|---|---|---|
| JP | 2689439 B2 | 3/1989 |
| JP | 2-044609 A | 2/1990 |
| JP | 3-059907 A | 3/1991 |
| JP | 11-302072 A | 11/1999 |
| JP | 2002-222703 A | 8/2002 |
| JP | 2005-086020 A | 3/2005 |
| JP | 2005-225735 A | 8/2005 |
| JP | 2007-001824 A | 1/2007 |

* cited by examiner

*Primary Examiner* — Nguyen T Ha
(74) *Attorney, Agent, or Firm* — Dickstein Shapiro LLP (57) ABSTRACT

A $SrTiO_3$-based grain boundary insulation type semiconductor ceramic contains a donor element in solid solution in crystal grains, an acceptor element at least in crystal grain boundaries, an integral width of (222) face of the crystal face of 0.500° or less, and an average powder grain size of crystal grains of 1.0 μm or less. A semiconductor ceramic is obtained by firing this ceramic, and a monolithic semiconductor ceramic capacitor is obtained by using the semiconductor ceramic. The $SrTiO_3$-based grain boundary insulation type semiconductor ceramic powder has a large apparent relative dielectric constant $\in r_{APP}$ of 5,000 or more even when the average ceramic grain size of crystal grains is 1.0 μm or less and which has an excellent insulating property. The monolithic semiconductor ceramic capacitor is capable of having a large capacity through reduction in thickness and multilayering.

20 Claims, 3 Drawing Sheets

SEMICONDUCTOR CERAMIC POWDER, SEMICONDUCTOR CERAMIC, AND MONOLITHIC SEMICONDUCTOR CERAMIC CAPACITOR

TECHNICAL FIELD

The present invention relates to a semiconductor ceramic powder, a semiconductor ceramic, and a monolithic semiconductor ceramic capacitor. In particular, the present invention relates to a $SrTiO_3$-based grain boundary insulation type semiconductor ceramic powder, a semiconductor ceramic produced by sintering this powder, and a monolithic semiconductor ceramic capacitor including the semiconductor ceramic.

BACKGROUND ART

In recent years, miniaturization of electronic components have been advanced rapidly as the electronics technology has been developed. In the field of the monolithic ceramic capacitor as well, demands for miniaturization and increases in capacity have intensified. Consequently, development of ceramic materials having high relative dielectric constants, reduction in thickness, and multilayering of dielectric ceramic layers have been advanced.

For example, Patent Document 1 proposes a dielectric ceramic represented by a general formula: $\{Ba_{1-x-y}Ca_xRe_yO\}_mTiO_2+\alpha MgO+\beta MnO$ (where Re represents a rare earth element selected from the group consisting of Y, Gd, Tb, Dy, Ho, Er, and Yb and $\alpha$, $\beta$, m, x, and y satisfy $0.001 \leq \alpha \leq 0.05$, $0.001 \leq \beta \leq 0.025$, $1.000 \leq m \leq 1.035$, $0.02 \leq x \leq 0.15$, and $0.001 \leq y \leq 0.06$, respectively).

Patent Document 1 discloses a monolithic ceramic capacitor including the above-described dielectric ceramic. The monolithic ceramic capacitor can have a thickness of 2 μm per ceramic layer, the total number of effective dielectric ceramic layers of 5, and a relative dielectric constant $\in r$ of 1,200 to 3,000 can be obtained.

The monolithic ceramic capacitor of Patent Document 1 takes advantage of a dielectric action of the ceramic in itself. On the other hand, research and development on semiconductor ceramic capacitors based on a principle different from this have also been conducted intensively.

For example, Patent Document 2 proposes a $SrTiO_3$-based grain boundary insulation type semiconductor ceramic element assembly having an average grain size of crystal grains of 10 μm or less and a maximum grain size of 20 μm or less.

This grain boundary insulation type semiconductor ceramic is produced by firing (primary firing) a ceramic compact in a reducing atmosphere to convert it to a semiconductor and, thereafter, conducting firing (secondary firing (reoxidation)) in an oxidizing atmosphere to convert the crystal grain boundaries to insulators, so that a capacitance is acquired at the crystal grain boundaries.

Consequently, in Patent Document 2, a semiconductor ceramic element assembly is obtained, which is a semiconductor ceramic capacitor having a single-layered structure and which has an apparent relative dielectric constant $\in r_{APP}$ of 9,000 in the case where the average grain size of crystal grains is 8 μm.

In addition, Patent Document 3 proposes a method for manufacturing a grain boundary insulation type monolithic semiconductor ceramic capacitor including a firing step to fire a laminate composed of layers formed from a semiconductor ceramic material, in which a composition containing $(Sr_{1-x-y}Ca_{x-y}Y_y)_m(Ti_{1-z}Nb_z)O_3$ as a primary component contains at least one type of secondary component selected from a V oxide, a Mo oxide, and a W oxide within the range of 0.1 to 0.5 percent by mole based on the molar ratio of the total amount of oxides to the primary component after firing basis, and nickel internal electrode layers, a reoxidation product addition step to add a reoxidation product to the laminate, and a step to reoxidize the laminate after the addition, wherein the above-described reoxidation step is conducted through a heat treatment in a nitrogen atmosphere under a predetermined reoxidation condition.

In Patent Document 3, a $SrTiO_3$-based grain boundary insulation type monolithic semiconductor ceramic having a thickness of 3 μm per semiconductor ceramic layer and an outside dimension of 3.2 mm in length, 1.6 mm in width, and 1.2 mm in height is prototyped, and characteristics of a voltage value, at which 1 mA of current passes, that is, a varistor voltage $V_{1mA}$, of 2.49 V to 3.06 V and an apparent relative dielectric constant $\in r_{APP}$ of 2,500 to 4,100 are obtained.

Patent Document 1: Japanese Unexamined Patent Application Publication No. 11-302072
Patent Document 2: Japanese Patent No. 2689439
Patent Document 3: Japanese Unexamined Patent Application Publication No. 2005-86020

DISCLOSURE OF INVENTION

In the case where reduction in thickness and multilayering of ceramic layers are pushed forward by using the dielectric ceramic described in Patent Document 1, there are problems in that the relative dielectric constant decreases when a bias is applied, the temperature characteristic of the capacitance deteriorates, and short-circuit failures increase sharply.

Consequently, when it is attempted to obtain a thin layer monolithic ceramic capacitor having a large capacity of, for example, 100 μF or more, the thickness of the dielectric ceramic layer is required to be about 1 μm per layer, and the number of laminated layers is required to be about 700 layers to 1,000 layers. However, under present circumstances, such a large-capacity monolithic ceramic capacitor has not been supplied as a general purpose product to the market.

On the other hand, the $SrTiO_3$-based grain boundary insulation type semiconductor ceramics described in Patent Documents 2 and 3 exhibit a small electric field dependence of the apparent relative dielectric constant $\in r_{APP}$ and have a varistor characteristic. Therefore, breakage of the element can be avoided even when a high voltage is applied, so that application to the field of capacitors is expected.

However, the average grain size in Patent Document 2 is a large 4 μm even at a minimum (refer to Patent Document 2, Table 1) and, therefore, there is a limit to reduction in thickness and there is not even a remotest possibility that a large-capacity monolithic capacitor is obtained by reduction in thickness and multilayering.

With respect to Patent Document 3, since the varistor voltage $V_{1mA}$ is a low 2.49 V to 3.06 V, as described above, it is almost practically impossible to design a rated voltage for a capacitor element. Moreover, the apparent relative dielectric constant $\in r_{APP}$ is also a low 2,500 to 4,100 and, therefore, superiority is not recognized as compared with even a monolithic ceramic capacitor under the present situation.

The present invention has been made in consideration of the above-described circumstances. Accordingly, it is one of the objects of the present invention to provide a $SrTiO_3$-based grain boundary insulation type semiconductor ceramic powder having a large apparent relative dielectric constant $\in r_{APP}$ of 5,000 or more even when the average ceramic grain size of crystal grains is 1.0 μm or less and an excellent insulating property, a semiconductor ceramic produced by sintering the semiconductor ceramic powder, and a monolithic semiconductor ceramic capacitor capable of having a large capacity through reduction in thickness and multilayering by using the semiconductor ceramic.

MEANS FOR SOLVING THE PROBLEMS

A donor element is contained in solid solution in the crystal grains of the $SrTiO_3$-based grain boundary insulation type semiconductor ceramic in order to convert the ceramic to a semiconductor. In this type of semiconductor ceramic, where an acceptor element is present at crystal grain boundaries, oxygen is adsorbed at grain boundaries due to the above-described acceptor element during the secondary firing. Consequently, the dielectric characteristic can be improved.

The present inventor adjusted the composition such that a donor element was contained in solid solution in crystal grains and an acceptor element was present at crystal grain boundaries, and conducted intensive research. As a result, it was found that the characteristics, e.g., the apparent relative dielectric constant $\in r_{APP}$ and the insulating property, could be improved by improving the crystallinity at a powder stage before sintering, and by making the crystal grains into a fine powder state as much as possible. Furthermore, as a result of intensive research further conducted by the present inventor, it was found that in the case where the integral width (integrated intensity/peak intensity) β of the (222) face of the crystal face was 0.500° or less and the average powder grain size was 1.0 μm or less, a good insulating property could be obtained because the apparent relative dielectric constant $\in r_{APP}$ became 5,000 or more, and the specific resistance log ρ (ρ: Ω·cm) became 10 or more even when the average ceramic grain size of crystal grains after sintering was 1.0 μm or less.

The present invention has been made on the basis of the above-described findings. A semiconductor ceramic powder according to the present invention is characterized by being a $SrTiO_3$-based grain boundary insulation type semiconductor ceramic powder, wherein a donor element is contained in solid solution in crystal grains and, in addition, an acceptor element is present at least in crystal grain boundaries, the integral width of (222) face of the crystal face is 0.500° or less, and the average powder grain size of crystal grains is 1.0 μm or less.

Furthermore, the semiconductor ceramic powder according to the present invention is characterized in that the above-described donor element preferably contains at least one element selected from La, Sm, Dy, Ho, Y, Nd, Ce, Nb, Ta, and W.

Moreover, the semiconductor ceramic powder according to the present invention is characterized in that the above-described acceptor element preferably contains at least one element selected from Mn, Co, Ni, and Cr.

In addition, a semiconductor ceramic according to the present invention is characterized by being produced through sintering of the above-described semiconductor ceramic powder.

In this regard, it is desirable to specify the average ceramic grain size of crystal grains to be 1.0 μm or less in order to obtain the large-capacity monolithic semiconductor ceramic capacitor through reduction in thickness and multilayering. However, crystal grains become coarse due to grain growth during the firing treatment. Therefore, even when the average powder grain size of the semiconductor ceramic powder is 1.0 μm or less, sometimes, it is difficult to specify the average ceramic grain size to be 1.0 μm or less merely by adjusting the composition.

The present inventor conducted further intensive research and it was discovered that the grain growth of crystal grains during the firing treatment was suppressed and the average ceramic grain size of crystal grains was able to be specified to be 1.0 μm or less by conducting the firing treatment while the firing temperature was set at a temperature lower than the calcination temperature.

That is, the semiconductor ceramic according to the present invention is characterized by being produced through sintering at a temperature lower than the calcination temperature during production of the above-described semiconductor ceramic powder.

Furthermore, a monolithic semiconductor ceramic capacitor according to the present invention is characterized by including internal electrodes disposed in a component element assembly and external electrodes, which can be electrically connected to the above-described internal electrodes and which are disposed on surfaces of the above-described component element assembly, wherein the above-described component element assembly is formed from the above-described semiconductor ceramic.

ADVANTAGES

According to the semiconductor ceramic powder of the present invention, the donor element, e.g., La or Sm, is contained as a solid solution in the crystal grains and, in addition, the acceptor element, e.g., Mn or Co, is present at least in the crystal grain boundaries, the integral width of (222) face of the crystal face is 0.500° or less, and the average powder grain size of crystal grains is 1.0 μm or less. Consequently, the electrical characteristics of the apparent relative dielectric constant $\in r_{APP}$ of 5,000 or more and the specific resistance log ρ (ρ: Ω·cm) of 10 or more can be obtained even when the average ceramic grain size of crystal grains after sintering is 1.0 μm or less.

Furthermore, the semiconductor ceramic according to the present invention is produced through sintering of the above-described semiconductor ceramic powder. Therefore, as described above, the apparent relative dielectric constant $\in r_{APP}$ becomes a large 5,000 or more and the specific resistance log ρ (ρ: Ω·cm) becomes 10 or more, so that an excellent insulating property is exhibited and a semiconductor ceramic having good electrical characteristics can be obtained.

Moreover, the semiconductor ceramic is produced through sintering at a temperature lower than the calcination temperature during production of the above-described semiconductor ceramic powder. Therefore, the average ceramic grain size of crystal grains can be reduced to 1.0 μm or less, so that a semiconductor ceramic suitable for reduction in thickness and multilayering can be obtained.

In addition, the component capacitor element assembly is formed from the above-described semiconductor ceramic. Therefore, even in the case where the thickness of the semiconductor ceramic layer constituting the component element assembly is reduced to about 1.0 μm, it becomes possible to realize a large-capacity high-performance monolithic semiconductor ceramic capacitor, which has a large apparent relative dielectric constant $\in r_{APP}$ and a large specific resistance, through reduction in thickness and multilayering, whereas it has not been able to realize this with respect to the monolithic ceramic capacitor in the related art.

In particular, the $SrTiO_3$-based grain boundary insulation type semiconductor ceramic has a varistor function. Therefore, a surge-resistant capacitor and surge-absorbing capacitor can be realized, whereas it is believed to be impossible to realize the same with respect to the monolithic ceramic capacitor in the related art.

REFERENCE NUMERALS

1 component element assembly
1a to 1g semiconductor ceramic layer
2 internal electrode
3a, 3b external electrode

BEST MODES FOR CARRYING OUT THE INVENTION

Next, the embodiments according to the present invention will be described in detail.

A semiconductor ceramic powder as an embodiment of the present invention is a $SrTiO_3$-based grain boundary insulation type semiconductor ceramic powder, wherein a donor element is contained as a solid solution in crystal grains and, in addition, an acceptor element is present at least in the crystal grain boundaries, the integral width β of (222) face of the crystal face is 0.500° or less, and the average powder grain size of crystal grains is specified to be 1.0 μm or less.

The ceramic can be converted to a semiconductor by allowing crystal grains to contain the donor element as a solid solution. Furthermore, regarding the grain boundary insulation type semiconductor ceramic capacitor, after the composition is converted to a semiconductor, secondary firing is conducted and, thereby, crystal grain boundaries are converted to insulators. In this case, if the acceptor element is present at the crystal grain boundaries, oxygen is adsorbed by the grain boundaries due to the above-described acceptor element during the secondary firing. Consequently, the dielectric characteristics can be improved.

In this situation, it is difficult to obtain a semiconductor ceramic having desired characteristics in which the apparent relative dielectric constant $\in r_{APP}$ is 5,000 or more, the specific resistance log ρ (ρ: Ω·cm) is 10 or more, and an insulating property is excellent, merely by adjusting the contents of the donor element and the acceptor element.

Research by the present inventor made it clear that the crystallinity of crystal grains at a powder state before sintering had an influence on the electrical characteristics of the semiconductor ceramic.

Figure 1:
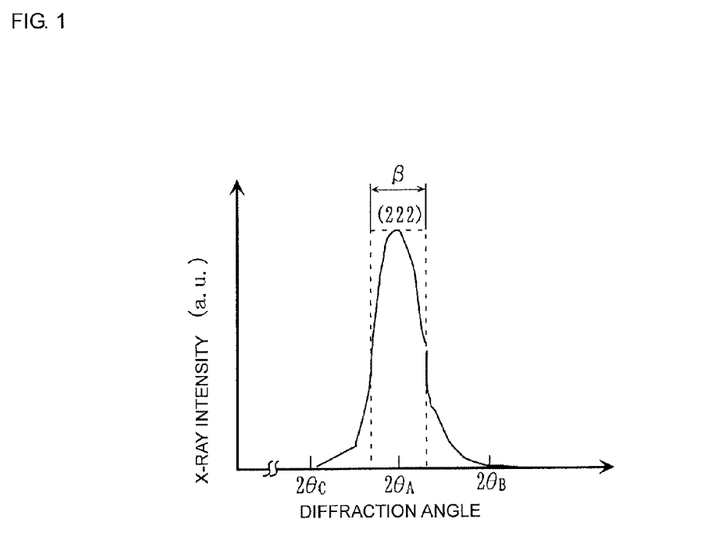
FIG. 1 is a diagram for explaining the significance of the integral width β of (222) face.

The crystallinity of crystal grains at a powder state before sintering was evaluated on the basis of the integral width (integrated intensity/peak intensity) β, as shown in FIG. 1. As a result, it was made clear that the electrical characteristics were able to be improved by adjusting the composition component in such a way as to come into a highly crystalline state in which the integral width β of (222) face of the crystal face was 0.500° or less.

It was always clear that even when the above-described integral width β was 0.500° or less, a sufficient improvement of the electrical characteristics was not achieved in the case where the average powder grain size of crystal grains exceeded 1.0 μm.

Subsequently, the composition component and the calcination temperature were adjusted, the semiconductor ceramic powder having the above-described integral width β of 0.500° or less and the average powder grain size of crystal grains of 1.0 μm or less was produced and sintered, and the electrical characteristics were measured. As a result, it was made clear that a semiconductor ceramic having an apparent relative dielectric constant $\in r_{APP}$ of 5,000 or more, a specific resistance log ρ (ρ: Ω·cm) of 10 or more, and a good insulating property was able to be obtained stably.

When merely the above-described integral width β is 0.500° or less, or in the case where merely the average powder grain size of crystal grains before sintering is 1.0 μm or less, desired electrical characteristics cannot be obtained yet. The semiconductor ceramic having desired electrical characteristics, (the apparent relative dielectric constant $\in r_{APP}$ is 5,000 or more, the specific resistance log ρ (ρ: Ω·cm) is 10 or more, and an insulating property is good) can be obtained by satisfying both the above-described integral width β of 0.500° or less and the average powder grain size of crystal grains before sintering of 1.0 μm or less.

For example, in the case where the integral width β exceeds 0.500°, even when the average powder grain size of crystal grains before sintering corresponds to that of very fine grains (for example, 0.2 μm or less), the specific resistance log ρ (ρ: Ω·cm) is extremely reduced to the extent that an insulating property in itself does not become apparent. If the above-described integral width β exceeds 0.500°, even when the average powder grain size corresponds to that of the above-described very fine grains, the grains more than double through grain growth during firing. Moreover, the reoxidation performance is extremely reduced and, thereby, the specific resistance is reduced extremely to the extent that the insulating property in itself does not become apparent even when a capacitor is formed.

The molar content of the donor element is not specifically limited. However, 2.0 mol or less relative to 100 mol of Ti element is preferable. This is because if the donor element exceeds 2.0 mol relative to 100 mol of Ti element, the sinterability deteriorates and a reduction in apparent relative dielectric constant $\in r_{APP}$ may be invited. In this connection, 1.0 mol or less relative to 100 mol of Ti element is more preferable, and further preferably, 0.8 to 1.0 mol is desirable.

The donor element is not specifically limited as long as the element is contained as a solid solution in crystal grains and functions as a donor. For example, rare earth elements, e.g., La, Sm, Dy, Ho, Y, Nd, and Ce, and Nb, Ta, W, and the like can be used.

Likewise, the molar content the acceptor element present in crystal grain boundaries is not specifically limited, but 0.1 to 1.0 mol relative to 100 mol of Ti element is preferable. This is because if the molar content of the acceptor element exceeds 1.0 mol relative to 100 mol of Ti element, reduction in apparent relative dielectric constant $\in r_{APP}$ and insulating property may be invited, while in the case of less than 0.1 mol, it may be difficult for the dielectric characteristics and the insulating property to become apparent. In this connection, more preferably, about 0.5 mol relative to 100 mol of Ti element is desirable.

It is indispensable that the acceptor element is present at least in the crystal grain boundaries. However, the acceptor element may also be contained as a solid solution in the crystal grains within the bounds of not affecting the characteristics. In this connection, as for such an acceptor element, transition metal elements, e.g., Mn, Co, Ni, and Cr, can be used.

It is also preferable that a low-melting point oxide within the range of 0.1 mol or less relative to 100 mol of Ti element is added to the above-described semiconductor ceramic powder, in particular at crystal grain boundaries. The sinterability can be improved and, in addition, segregation of the above-described acceptor element into crystal grain boundaries can be facilitated by adding such a low-melting point oxide.

In this connection, if the molar content of the low-melting point oxide exceeds 0.1 mol relative to 100 mol of Ti element, a reduction in apparent relative dielectric constant $\in r_{APP}$ may be invited. Therefore, in the case where the low-melting point oxide is added, 0.1 mol or less relative to 100 mol of Ti element is preferable, as described above.

The low-melting point oxide is not specifically limited, and $SiO_2$, glass ceramic containing B or alkali metal element (K, Li, Na, or the like), copper-tungsten oxide, and the like can be used. However, $SiO_2$ is used preferably.

In addition, the molar ratio m of the Sr site to the Ti site is not specifically limited insofar as m is in the vicinity of the stoichiometric composition (m=1.000). It is preferable that $0.995 \leq m \leq 1.020$ is satisfied. This is because, if the blend molar ratio m becomes less than 0.995, the average powder grain size of crystal grains may become larger than 1.0 μm, while if the molar ratio m exceeds 1.020, a deviation from the stoichiometric composition increases and, thereby, sintering may become difficult. In this connection, preferably, the molar ratio m further satisfies $0.995 \leq m \leq 1.010$, and more preferably $1.000 < m \leq 1.010$.

The semiconductor ceramic is obtained by sintering the above-described semiconductor ceramic powder. At that time, it is preferable that the firing temperature is set at a temperature lower than the calcination temperature during production of the semiconductor ceramic powder.

The average powder grain size of crystal grains can be controlled at 1.0 μm or less by adjusting the composition range and selecting the calcination temperature. However, sometimes, it is difficult to control the average ceramic grain size of crystal grains of the semiconductor ceramic (sintered body) at 1 μm or less merely by adjusting the composition and temperature, and a reduction in thickness and an increase in capacity may be hindered. This is because even when the average powder grain size of the semiconductor ceramic powder after calcination is 1.0 μm or less, which is in the state of a fine powder, grain growth of crystal grains occurs when conducting a firing treatment such that the crystal grains become coarse. That is, the case where the average powder grain size of the crystal grains of the semiconductor ceramic powder is sufficiently small relative to 1.0 μm is particular, and also in the case where the average powder grain size of crystal grains is close to 1.0 μm, grain growth of crystal grains occurs during the firing treatment, so that the crystal grains become coarse. Consequently, sometimes, it becomes difficult to control the average ceramic grain size of crystal grains at 1.0 μm or less.

Therefore, it is preferable that grain growth of crystal grains is suppressed by conducting the firing treatment while the firing temperature is set at a temperature lower than the calcination temperature. Consequently, the average ceramic grain size of crystal grains can be specified to be 1.0 μm or less reliably.

As described above, a semiconductor ceramic having an apparent relative dielectric constant $\in r_{APP}$ of 5,000 or more, a specific resistance log ρ (ρ: Ω·cm) of 10 or more, and an excellent insulating property can be obtained in spite of the fact that the average ceramic grain size of crystal grains is 1.0 μm or less, which corresponds to that of very fine grains.

Figure 2:
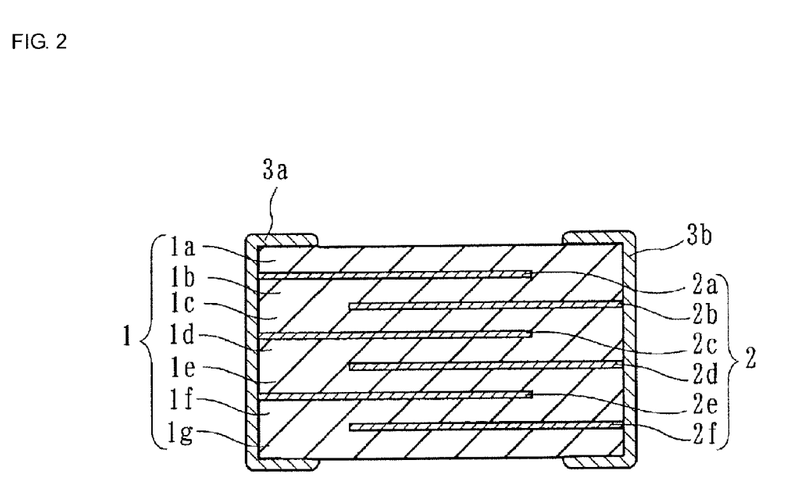
FIG. 2 is a sectional view schematically showing an embodiment of a monolithic semiconductor ceramic capacitor produced by using a semiconductor ceramic according to the present invention.

FIG. 2 is a sectional view schematically showing an embodiment of a monolithic semiconductor ceramic capacitor produced by using a semiconductor ceramic according to the present invention.

In the monolithic semiconductor ceramic capacitor, internal electrodes 2(2a to 2f) are embedded in a component element assembly 1 formed from the semiconductor ceramic of the present invention and, in addition, external electrodes 3a and 3b are disposed on both end portions of the component element assembly 1.

That is, the component element assembly 1 is composed of a monolithic sintered body in which a plurality of semiconductor ceramic layers 1a to 1g and internal electrodes 2a to 2f are laminated alternately. The internal electrodes 2a, 2c, and 2e are electrically connected to the external electrode 3a, and the internal electrodes 2b, 2d, and 2f are electrically connected to the external electrode 3b. Furthermore, capacitances are formed between opposed surfaces of the internal electrodes 2a, 2c, and 2e and the internal electrodes 2b, 2d, and 2f.

Next, a method for manufacturing the above-described semiconductor ceramic capacitor will be described.

Initially, each of a Sr compound, e.g., $SrCO_3$, a donor compound containing a donor element, e.g., La or Sm, an acceptor compound, e.g., Mn or Co, and a Ti compound, e.g., $TiO_2$, having a specific surface area of preferably 10 m²/g or more (average grain size: about 0.1 μm or less) is prepared as a ceramic raw material. Predetermined amounts of these ceramic raw materials are weighed.

Subsequently, the resulting weighed material is blended with a predetermined amount of dispersing agent and is put into a ball mill together with pulverization media, e.g., PSZ (Partially Stabilized Zirconia) balls, and water. Wet-mixing is conducted sufficiently in the ball mill to produce a slurry.

Then, the resulting slurry is heated (dried), and thereafter, a calcination treatment is conducted in an air atmosphere at a predetermined temperature (for example, 1,300° C. to 1,450° C.) for about 2 hours, so as to produce a calcined powder.

Next, predetermined amounts of low-melting point oxides, e.g., $SiO_2$, are weighed as necessary. Subsequently, these low-melting point oxides are added to the above-described calcined powder, pure water, and the dispersing agent, as necessary, and wet-mixing is conducted sufficiently, followed by heating (drying). Thereafter, a heat treatment is conducted in an air atmosphere at a predetermined temperature (for example, 600° C.) for about 5 hours, so as to produce a heat-treated powder.

Then, the resulting heat-treated powder is blended with appropriate amounts of organic solvent, e.g., toluene or alcohol, and a dispersing agent and, thereafter, is put into a ball mill again together with the above-described pulverization media. Wet-mixing is conducted sufficiently in the ball mill. Subsequently, appropriate amounts of organic binder and plasticizer are added and wet-mixing is conducted for sufficiently long time so that a ceramic slurry is thereby produced.

Next, the ceramic slurry is subjected to shaping by using a shaping method, e.g., a doctor blade method, a lip coater method, or a die coater method, so as to produce a ceramic green sheet in such a way that the thickness after firing becomes a predetermined thickness (for example, 1 to 2 μm).

Thereafter, screen printing, gravure printing, vacuum evaporation, or sputtering is applied to the ceramic green sheet by using an electrically conductive paste for an internal electrode, so as to form an electrically conductive film with a predetermined pattern on the surface of the above-described ceramic green sheet.

In this connection, the electrically conductive material contained in the electrically conductive paste for an internal electrode is not specifically limited. However, it is preferable to use a base metal material, e.g., Ni or Cu.

Subsequently, the predetermined number of ceramic green sheets provided with the electrically conductive film are laminated in a predetermined direction and, in addition, outside layer ceramic green sheets provided with no electrically conductive film are laminated. Then, contact bonding is conducted, and cutting into a predetermined dimension is conducted, so as to produce a ceramic laminate.

Thereafter, a debinding treatment is conducted in an air atmosphere at a temperature of 200° C. to 300° C. and, furthermore, in a weak reducing atmosphere at a temperature of 700° C. to 800° C., as necessary. Subsequently, a firing furnace brought into a reducing atmosphere, in which a $H_2$ gas and a $N_2$ gas constitute a predetermined flow rate ratio (for example, $H_2/N_2=0.025/100$ to $1/100$), is used, and primary firing is conducted in the firing furnace at a temperature of 1,150° C. to 1,300° C. for about 2 hours, so as to convert the ceramic laminate to a semiconductor. That is, the primary firing is conducted at a low temperature lower than or equal to the calcination temperature (1,300° C. to 1,450° C.), so as to convert the ceramic laminate to the semiconductor.

In this primary firing treatment, the oxygen partial pressure in the firing furnace is increased sharply at the start of cooling after firing so as to set the oxygen partial pressure at the start of cooling (oxygen partial pressure in cooling) at $1.0 \times 10^4$ times the oxygen partial pressure in the firing process (oxygen partial pressure in firing) or more, and a cooling treatment is conducted.

That is, in the present embodiment, the oxygen partial pressure in the firing furnace is increased sharply at the start of cooling after firing by supplying large amounts of steam into the firing furnace and, furthermore, decreasing the flow rate of supply of the $H_2$ gas into the firing furnace by a predetermined amount (for example, 1/10). Specifically, the cooling treatment is conducted while the ratio of the oxygen partial pressure in cooling to the oxygen partial pressure in firing, that is, the oxygen partial pressure ratio $\Delta PO_2$, is set at $1.0 \times 10^4$ or more. Consequently, a still larger specific resistance can be obtained while the apparent relative dielectric constant $\in r_{APP}$ of 5,000 or more is ensured.

In this connection, the above-described "at the start of cooling" includes not only the time of entrance into the cooling process, but also the short time in which the temperature in the furnace is lowered from the maximum temperature by a predetermined temperature (for example, 30° C. to 50° C.) after entrance into the cooling process.

The reasons for setting of the oxygen partial pressure in cooling at $1.0 \times 10^4$ times the oxygen partial pressure in firing or more will be described with reference to FIG. 3.

Figure 3:
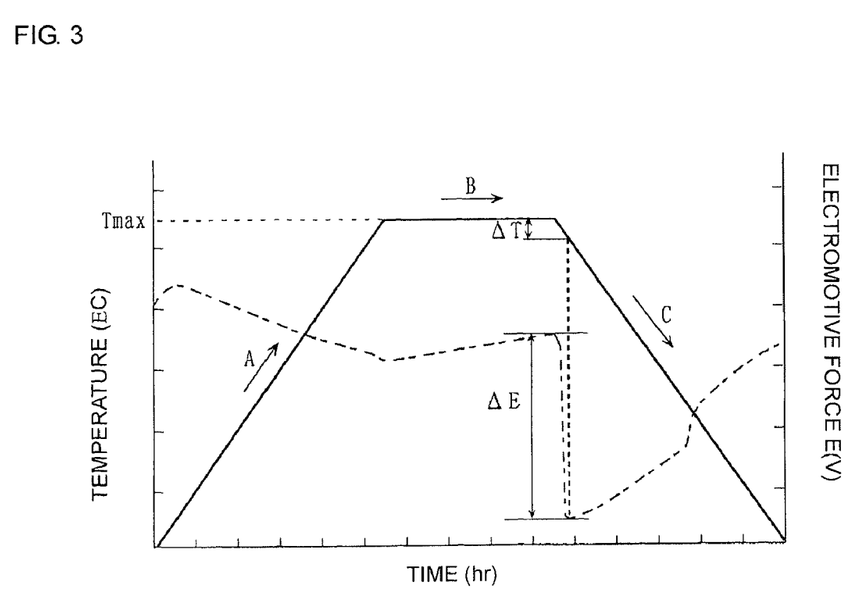
FIG. 3 is a diagram showing an example of a firing profile and changes in the electromotive force with time.

FIG. 3 is a diagram showing the firing profile and changes in the electromotive force E with time. The horizontal axis indicates the time (hr), the left vertical axis indicates the temperature (° C.), the right vertical axis indicates the electromotive force E (V), a solid line indicates the firing profile, and alternate long and short dashed lines indicate the changes in the electromotive force with time.

In the firing profile, the temperature in the furnace is raised as indicated by an arrow A (temperature raising process) at the start of the firing treatment. Subsequently, the maximum firing temperature Tmax (in the present embodiment, 1,150° C. to 1,300° C.) is kept for about 2 hours as indicated by an arrow B (firing process). Thereafter, the temperature in the furnace is lowered as indicated by an arrow C so as to cool the fired material (cooling process).

The Nernst equation represented by Mathematical expression (1) holds between the electromotive force E (V) and the oxygen partial pressure $PO_2$ (atm) in the firing furnace.

$$E=(2.15 \times 10^{-5} \times T) \times Ln(PO_2/0.206) \quad (1)$$

where, T represents an absolute temperature (K) in the firing furnace.

Therefore, the oxygen partial pressure $PO_2$ can be determined by measuring the electromotive force E.

Then, steam was supplied into the firing furnace at the time of entrance into the cooling process and, furthermore, the flow rate of supply of the hydrogen gas into the firing furnace was decreased, as necessary, while changes in electromotive force E with time in the firing furnace was measured with a direct insertion type zirconia oxygen sensor. As a result, it was made clear that, as indicated by the alternate long and short dashed lines in FIG. 3, the electromotive force E always becomes a local minimum at the point in time when the temperature in the furnace was lowered from the maximum firing temperature Tmax by a predetermined temperature $\Delta T$ (for example, 30° C. to 50° C.) and, thereafter, the electromotive force E increased gradually. Therefore, according to mathematical expression (1), the oxygen partial pressure $PO_2$ becomes a local maximum at the point in time when the temperature in the furnace is lowered from the maximum firing temperature Tmax by the predetermined temperature $\Delta T$.

The present inventor repeatedly conducted experiments wherein the local maximum oxygen partial pressure $PO_2$ was assumed to be the oxygen partial pressure in cooling, the oxygen partial pressure at the maximum firing temperature Tmax was assumed to be the oxygen partial pressure in firing, and the oxygen partial pressure ratio $\Delta PO_2$ (=oxygen partial pressure in cooling/oxygen partial pressure in firing) of the two was changed variously while the flow rate of supply of the steam and the flow rate of supply of the $H_2$ gas into the furnace were adjusted. As a result, it was made clear that a still larger specific resistance was able to be obtained while the apparent relative dielectric constant $\in r_{APP}$ of 5,000 or more was ensured by specifying the above-described oxygen partial pressure ratio $\Delta PO_2$ to be $1.0 \times 10^4$ or more.

Consequently, in the present embodiment, primary firing is conducted while the oxygen partial pressure ratio $\Delta PO_2$ is set at $1.0 \times 10^4$ or more and then the cooling treatment is conducted.

After the ceramic laminate is converted to a semiconductor through the primary firing as described above, secondary firing is conducted in a weak reducing atmosphere, in an air atmosphere, or in an oxidizing atmosphere for 1 hour at a low temperature of 600° C. to 900° C. in order that the internal electrode material, e.g., Ni or Cu, is not oxidized, so as to reoxidize the semiconductor ceramic and, thereby, form a grain boundary insulating layer. In this manner, the component element assembly 1 is produced, in which the internal electrodes 2 are embedded.

Subsequently, an electrically conductive paste for an external electrode is applied to both end surfaces of the component element assembly 1, a baking treatment is conducted and, thereby, the external electrodes 3a and 3b are formed. In this manner, the monolithic semiconductor ceramic capacitor is produced.

In this connection, an electrically conductive material contained in the electrically conductive paste for an external electrode is not specifically limited. However, it is preferable to use materials such as Ga, In, Ni, and Cu, and it is also possible to form an Ag electrode on an electrode.

Alternatively, as for the method for forming the external electrodes 3a and 3b, the electrically conductive paste for an external electrode may be applied to both end surfaces of the ceramic laminate and, thereafter, a firing treatment may be conducted at the same time with the ceramic laminate.

In the present embodiment, the monolithic semiconductor ceramic capacitor is produced by using the above-described semiconductor ceramic. Therefore, the layer thickness of each of the semiconductor ceramic layers 1a to 1g can be reduced to 1.0 μm or less. Even in the case where the layer thickness is reduced as described above, it becomes possible to realize a large-capacity high-performance monolithic semiconductor ceramic capacitor, which has a large apparent relative dielectric constant $\in r_{APP}$ of 5,000 or more per layer and a large specific resistance log ρ (ρ: Ω·cm) of 10 or more, through reduction in thickness and multilayering, whereas it has not been able to realize the same with respect to the monolithic ceramic capacitor in the related art. Furthermore, it is not necessary to take the polarity into consideration, good handleability is exhibited, and the resistance is low even in high frequencies as compared with large-capacity tantalum capacitors. Therefore, there is usefulness as alternatives to these tantalum capacitors.

As is described above, it is known that a $SrTiO_3$-based grain boundary insulation type semiconductor ceramic has varistor characteristic. In the present embodiment, since the average ceramic grain size of crystal grains is 1.0 μm or less, which corresponds to that of fine grains, the varistor voltage can increase. Therefore, uses for a general purpose capacitor are expanded by the use as a capacitor in a usual field strength region (for example, 1 V/μm), in which the voltage-current characteristic exhibits linearity. In addition, since the varistor characteristic is provided, breakage of the element can be prevented even when an abnormally high voltage is applied to the element, so that a capacitor exhibiting excellent reliability can be obtained.

Furthermore, since the varistor voltage can increase, as described above, a capacitor, which can avoid breakage against a surge voltage and the like, can be realized. That is, a low-capacity capacitor used for an ESD (electro-static discharge) application is required to have a surge-resistant characteristic. In the case where a breakage voltage is high, it is possible to use the capacitor for an application as an ESD-resistant guarantee capacitor, e.g., a surge-resistant and a surge-absorbing capacitor.

The present invention is not limited to the above-described embodiment. FIG. 2 shows the monolithic semiconductor ceramic capacitor, in which a plurality of semiconductor ceramic layers 1a to 1g and the internal electrodes 2a to 2f are laminated alternately. However, a monolithic semiconductor ceramic capacitor can have a structure in which an internal electrode is formed through evaporation or the like on a surface of a single sheet (for example, the thickness is about 200 μm) of a semiconductor ceramic and several layers of the single sheets (for example, 2 or 3 layers) are bonded together with an adhesive. Such a structure is effective for a monolithic semiconductor ceramic capacitor used for low capacity application, for example.

In the above-described embodiment, the solid solution is produced by a solid phase method. However, the method for producing the solid solution is not specifically limited and any method, for example, a hydrothermal synthesis method, a sol•gel method, a hydrolysis method, or a coprecipitation method, can be used.

Furthermore, in the above-described embodiment, the secondary firing (reoxidation treatment) to form the grain boundary insulating layer can be conducted in an air atmosphere. However, the desired operation and effect can be obtained even when the oxygen concentration is reduced, as necessary, to some extent as compared with that of an air atmosphere.

Moreover, the above-described monolithic semiconductor ceramic capacitor is produced by conducting a cooling treatment in the primary firing treatment while the oxygen partial pressure at the start of cooling is set at $1.0 \times 10^4$ times the oxygen partial pressure in the firing process. However, even in the case where the primary firing treatment is conducted without specifically changing the oxygen partial pressure in the firing furnace, it is possible to obtain an apparent relative dielectric constant $\in r_{APP}$ of 5,000 or more and a log ρ (ρ: Ω·cm) of 10 or more. In this case, the semiconductor ceramic can be produced roughly as described below.

That is, predetermined amounts of donor compound and acceptor compound are weighed, and a predetermined amount of predetermined ceramic raw material is further weighed. After mixing and pulverization are conducted, a calcination treatment is conducted so as to produce a calcined powder. Furthermore, a low-melting point oxide, e.g., $SiO_2$, is weighed, as necessary, and this is mixed with the above-described calcined powder. A heat treatment is conducted so as to produce a heat-treated powder, and the heat-treated powder is subjected to a primary firing treatment in a reducing atmosphere. Thereafter, a secondary firing treatment is conducted in a weak reducing atmosphere, in an air atmosphere, or in an oxidizing atmosphere and, thereby, a semiconductor ceramic can be produced.

Next, examples of the present invention will be described specifically.

EXAMPLES

As for ceramic raw materials, $SrCO_3$, $LaCl_3$, $MnCl_2$, and $TiO_2$ having a specific surface area of 30 m²/g (average grain size: about 30 nm) were prepared. These ceramic raw materials were weighed in such a way that the crystal grain composition of the ceramic had the molar contents shown in Table 1 relative to 100 mol of the Ti element. Furthermore, 2 parts by weight of polycarboxylic acid ammonium salt relative to 100 parts by weight of the weighed material was added as a dispersing agent. Subsequently, the mixture was put into a ball mill together with PSZ balls having a diameter of 2 mm and water. Wet-mixing was conducted for 16 hours in the ball mill so as to produce a slurry.

Then, the resulting slurry was heated to vaporize volatile materials and dried. Thereafter, a calcination treatment was conducted in an air atmosphere at a calcination temperature shown in Table 1 for 2 hours, so as to obtain a calcined powder.

Next, a $MnCl_2$ aqueous solution and a $SiO_2$ sol solution were added to the above-described calcined powder in such a way that the molar contents of Mn element and $SiO_2$ in crystal grains became as shown in Table 1 relative to 100 mol of the Ti element. Pure water and a dispersing agent, as necessary, were further added and wet-mixing was conducted for 16 hours, followed by vaporization of volatiles and drying. Thereafter, a heat treatment was conducted in an air atmosphere at a temperature of 600° C. for 5 hours, so as to produce a heat-treated powder. In this connection, a $MnO_2$ sol may be used instead of the $MnCl_2$ aqueous solution, and tetraethoxysilane $(Si(OC_2H_5)_4)$ may be used instead of the $SiO_2$ sol solution.

Then, the above-described heat-treated powder was blended with appropriate amounts of organic solvent, e.g., toluene or alcohol, and dispersing agent and, was put into a ball mill again together with the PSZ balls having a diameter of 2 mm. Wet-mixing was conducted for 4 hours in the ball mill. Subsequently, appropriate amounts of polyvinyl butyral (PVB) serving as a binder and dioctyl phthalate (DOP) serving as a plasticizer were added and a wet-mixing treatment was further conducted for 16 hours, so that a ceramic slurry was thereby produced.

Next, the ceramic slurry was subjected to shaping by using the lip coater method, so as to produce a ceramic green sheet having a thickness of about 3.2 μm. Thereafter, the resulting ceramic green sheets were stamped into a predetermined size, and were stacked in such a way that the thickness became about 0.5 mm. Thermocompression bonding was conducted, so as to produce a ceramic compact.

Subsequently, the resulting ceramic compact was cut into 5 mm in length, 5 mm in width, and 0.5 mm in thickness. Then, a debinding treatment was conducted in an air atmosphere at a temperature of 250° C. for 6 hours and, furthermore, in a weak reducing atmosphere of $1.4 \times 10^{-15}$ MPa at a temperature of 800° C. for 5 hours.

Thereafter, primary firing was conducted in a strong reducing atmosphere, in which the flow rate ratio ($H_2/N_2$) of a $H_2$ gas to a $N_2$ gas was specified to be 1/100, at a temperature of 1,150° C. to 1,250° C. for 2 hours, so as to effect conversion to a semiconductor. In addition, at this time, a cooling treatment was conducted until the temperature of the firing furnace became 800° C. while the oxygen partial pressure $PO_2$ was adjusted in such a way that the oxygen partial pressure ratio $\Delta PO_2$ (=oxygen partial pressure in cooling/oxygen partial pressure in firing) became $1.0 \times 10^4$. That is, the cooling treatment was conducted while a zirconia oxygen sensor was inserted into the firing furnace and the electromotive force E, i.e. the oxygen partial pressure $PO_2$, was measured, steam was supplied into the firing furnace at the time of start of the cooling process and, in addition, the flow rate of supply of the $H_2$ gas was decreased in such a way that the flow rate ratio ($H_2/N_2$) of the $H_2$ gas to the $N_2$ gas was changed from 1/100 to 0.1/100, so as to control the oxygen partial pressure ratio $\Delta PO_2$ at $1.0 \times 10^4$ described above.

Then, a secondary firing was conducted in an air atmosphere at a temperature of 800° C. for 1 hour as a reoxidation treatment, so that a grain boundary insulation type semiconductor ceramic was produced.

Subsequently, In—Ga was applied to both end surfaces, so as to form the external electrodes. In this manner, samples of Sample Nos. 1 to 14 were produced.

Next, for each of these samples of Sample Nos. 1 to 14, the average powder grain size, the integral width β of (222) face, the average ceramic grain size, the apparent relative dielectric constant $\in r_{APP}$, and the specific resistance log ρ (ρ: Ω·cm) were determined.

The average powder grain size was determined by pulverizing the above-described sample after the above-described debinding treatment into the shape of a powder, conducting observation with a scanning electron microscope (SEM), and conducting image analysis of SEM photographs of a sample surface and a rupture surface.

Furthermore, the integral width β of (222) face was determined from an X-ray diffraction chart on the basis of analysis of the crystal structure with a parallel optical system by using an X-ray diffractometer (Rint2500: produced by RIGAKU Corporation) under the condition of a tube voltage of 50 kV and a tube current of 250 mA.

The apparent relative dielectric constant $\in r_{APP}$ was calculated from the measured capacitance and the sample dimension, wherein the capacitance was measured by using an impedance analyzer (HP4194A: produced by Agilent Technologies) under the condition of a frequency of 1 kHz and a voltage of 1 V.

The average ceramic grain size of crystal grains after sintering was determined by conducting observation with a scanning electron microscope (SEM), and conducting image analysis of SEM photographs of a sample surface and a rupture surface.

The specific resistance log ρ was determined by applying 5 to 500 V of direct current voltage for 2 minutes, measuring the insulation resistance IR at a field strength of 1 V/μm on the basis of the leakage current thereof, and calculating the specific resistance ρ from the insulation resistance IR and the sample dimension, followed by conversion to common logarithm.

Table 1 shows compositions of crystal grains and grain boundaries, calcination temperatures, and measurement results of Sample Nos. 1 to 14. In this connection, in Table 1, the number of moles of each of La, Mn, and $SiO_2$ represents the molar content relative to 100 mol of Ti.

TABLE 1

| | | Crystal grain | | Crystal grain boundary | | | Semiconductor ceramic powder | | Semiconductor ceramic (sintered body) | | |
|---|---|---|---|---|---|---|---|---|---|---|---|
| | | Molar content relative to 100 mol of Ti element | | Molar content relative to 100 mol of Ti element | | | Average powder grain size | Integral width β of (222) face | Average ceramic grain size | Apparent relative dielectric constant | Specific resistance |
| Sample No. | Molar ratio m (—) | La (mol) | Mn (mol) | Mn (mol) | $SiO_2$ (mol) | Calcination temperature (° C.) | (μm) | (°) | (μm) | $\in r_{APP}$ | logρ (ρ: Ω · cm) |
| 1 | 1.010 | 0.8 | 0.0080 | 0.5 | 0.1 | 1400 | 0.51 | 0.400 | 0.54 | 5310 | 11.4 |
| 2 | 1.010 | 0.8 | 0.0080 | 0.5 | 0.1 | 1350 | 0.49 | 0.500 | 0.52 | 5010 | 11.3 |
| 3 | 1.005 | 0.8 | 0.0400 | 0.5 | 0.1 | 1375 | 0.53 | 0.410 | 0.57 | 5470 | 11.2 |
| 4 | 1.005 | 0.8 | 0.0800 | 0.5 | 0.1 | 1375 | 0.61 | 0.395 | 0.68 | 5910 | 11.1 |
| 5 | 1.000 | 0.8 | 0.0400 | 0.5 | 0.1 | 1375 | 0.65 | 0.390 | 0.71 | 5280 | 10.9 |
| 6 | 1.000 | 0.8 | 0.0800 | 0.5 | 0.1 | 1375 | 0.68 | 0.385 | 0.73 | 5360 | 10.8 |
| 7 | 1.010 | 0.85 | 0 | 0.5 | 0.1 | 1400 | 0.58 | 0.405 | 0.65 | 5910 | 10.3 |
| 8 | 1.005 | 0.8 | 0 | 0.5 | 0.1 | 1375 | 0.53 | 0.415 | 0.64 | 5080 | 10.2 |

TABLE 1-continued

| | | Crystal grain | | Crystal grain boundary | | | Semiconductor ceramic powder | | Semiconductor ceramic (sintered body) | | |
| | | Molar content relative to 100 mol of Ti element | | Molar content relative to 100 mol of Ti element | | Calcination | Average powder grain | Integral width β of (222) | Average ceramic grain | Apparent relative dielectric | Specific resistance |
| Sample No. | Molar ratio m (—) | La (mol) | Mn (mol) | Mn (mol) | SiO$_2$ (mol) | temperature (° C.) | size (μm) | face (°) | size (μm) | constant $\epsilon r_{APP}$ | logρ (ρ: Ω · cm) |
|---|---|---|---|---|---|---|---|---|---|---|---|
| 9 | 1.000 | 0.4 | 0 | 0.5 | 0.1 | 1400 | 0.55 | 0.388 | 0.58 | 5560 | 10.8 |
| 10 | 1.000 | 1.2 | 0 | 0.5 | 0.1 | 1400 | 0.50 | 0.420 | 0.53 | 5030 | 11.0 |
| 11* | 0.990 | 0.8 | 0.0080 | 0.5 | 0.1 | 1400 | 1.50 | 0.450 | 1.60 | 4500 | 9.8 |
| 12* | 1.010 | 0.8 | 0.0800 | 0.5 | 0.1 | 1300 | 0.45 | 0.520 | 0.51 | 2830 | 11.2 |
| 13* | 1.000 | 0.8 | 0 | 0.5 | 0.1 | 1200 | 0.18 | 0.525 | 0.37 | 2740 | <6 |
| 14* | 1.000 | 0.8 | 0 | 0.5 | 0.1 | 1100 | 0.12 | 0.535 | 0.31 | 2650 | <6 |

*asterisked sample numbers indicate samples which are out of the present invention In Sample No. 11, the average powder grain size of the semiconductor ceramic powder was 1.50 μm, which exceeded 1.0 μm. Therefore, the average ceramic grain size of the sintered body was 1.60 μm and was coarse. As a result, the apparent relative dielectric constant $\epsilon r_{APP}$ was 4,500, which was less than 5,000, and the specific resistance log ρ was 9.8, which was 10 or less, so that the insulating property deteriorated.

In Sample No. 12, the integral width β of (222) face was 0.520°, which exceeded 0.500. Consequently, it was made clear that the specific resistance log ρ was a good 11.2, but the apparent relative dielectric constant $\epsilon r_{APP}$ was significantly reduced to 2,830.

In Sample No. 13, the average powder grain size was 0.18 μm, which corresponded to that of very fine grains, but the integral width β of (222) face was 0.525°, which exceeded 0.500. As a result, it was made clear that the specific resistance log ρ was reduced to less than 6.0 and the apparent relative dielectric constant $\epsilon r_{APP}$ was significantly reduced to 2,740. The reason for this is believed to be that although the average powder grain size was 0.20 μm or less, which corresponded to that of very fine grains, the integral width β of (222) face exceeded 0.500 and, therefore, the ceramic grain size more than doubled through grain growth during firing, and furthermore, the reoxidation performance deteriorated significantly, and as a result, an insulating property as the capacitor did not become apparent.

For the same reasons, it was made clear that the average powder grain size of Sample No. 14 was 0.12 μm, which corresponded to that of very fine grains, but the integral width β of (222) face was 0.535°, which exceeded 0.500, and thereby, the specific resistance log ρ was reduced to less than 6.0 and the apparent relative dielectric constant $\epsilon r_{APP}$ was significantly reduced to 2,650.

On the other hand, in Sample Nos. 1 to 10, the average powder grain sizes of the semiconductor ceramic powders were 0.49 to 0.68 μm and the integral widths β of (222) face were 0.400° to 0.500°, all of which were within the scope of the present invention. Therefore, the average ceramic grain sizes of crystal grains were 0.52 to 0.73 μm, the apparent relative dielectric constants $\epsilon r_{APP}$ were 5,010 to 5,910, and the specific resistances log ρ were 10.2 to 11.4. That is, it was made clear that a monolithic semiconductor ceramic capacitor having good dielectric characteristics and an excellent insulating property was able to be obtained, wherein the apparent relative dielectric constant $\epsilon r_{APP}$ was 5,000 or more and the specific resistance log ρ was 10 or more, although the average ceramic grain size of crystal grains was 1.0 or less.

Figure 4:
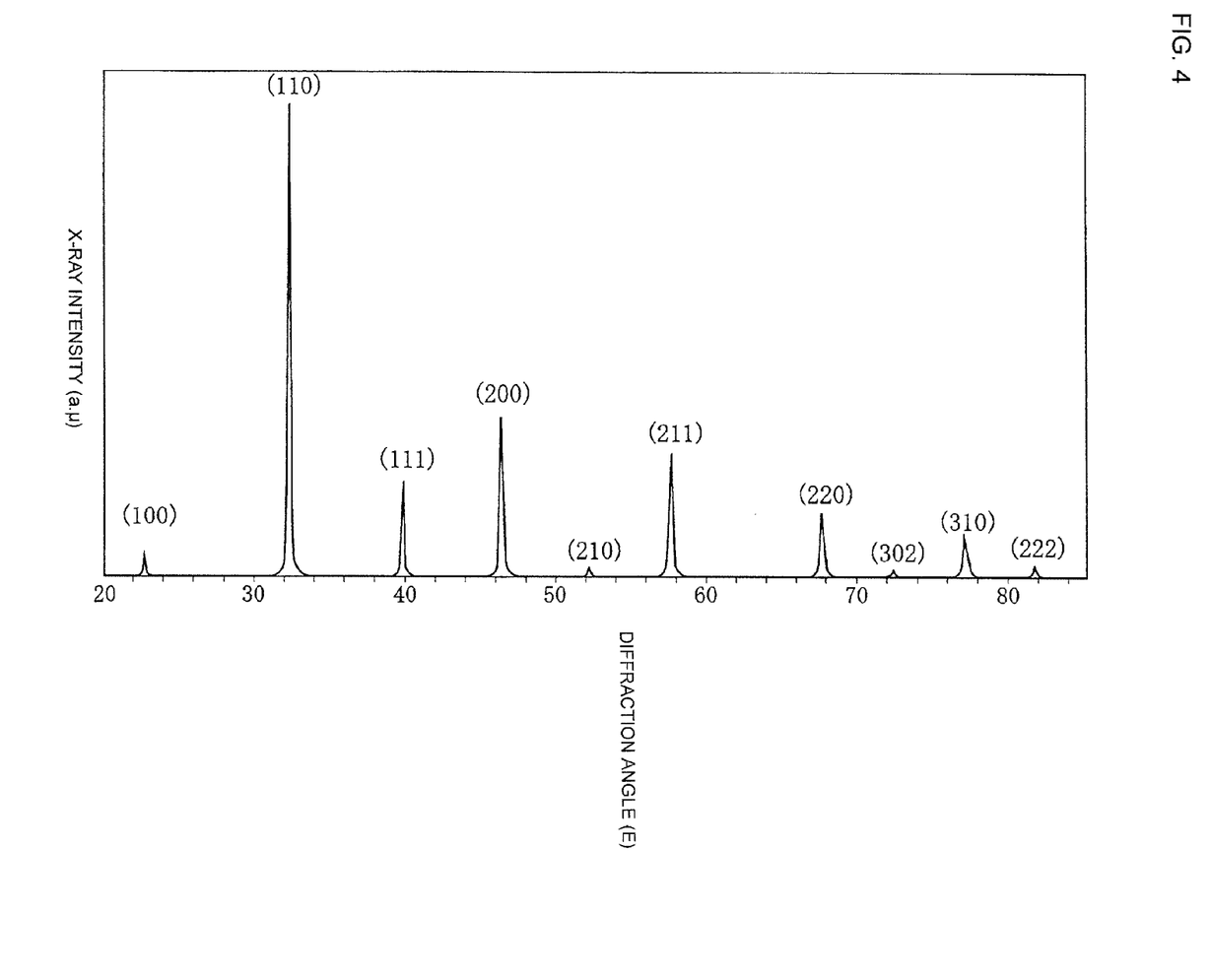
FIG. 4 is an X-ray diffraction chart of Sample No. 1.

FIG. 4 is an X-ray diffraction chart of Sample No. 1. The horizontal axis indicates the diffraction angle 2θ(°) and the vertical axis indicates the X-ray intensity (a.u.).

The integral width β of (222) face shown in FIG. 4 is the result of the crystallinity evaluation.

The invention claimed is:

1. A semiconductor ceramic powder which is a SrTiO$_3$-based grain boundary insulation type semiconductor ceramic powder containing a donor element as a solid solution in crystal grains and an acceptor element at least in crystal grain boundaries, wherein
   the integral width of (222) face of the crystal face is 0.500° or less, and
   the average powder grain size of crystal grains is 1.0 μm or less.

2. The semiconductor ceramic powder according to claim 1, characterized in that the donor element comprises at least one element selected from the group consisting of La, Sm, Dy, Ho, Y, Nd, Ce, Nb, Ta, and W.

3. The semiconductor ceramic powder according to claim 2, characterized in that the acceptor element comprises at least one type of element selected from the group consisting of Mn, Co, Ni, and Cr.

4. A semiconductor ceramic which is a sintered semiconductor ceramic powder according to claim 2.

5. The semiconductor ceramic according to claim 4, characterized by having been sintering at a temperature lower than the calcination temperature of the semiconductor ceramic powder.

6. A monolithic semiconductor ceramic capacitor comprising internal electrodes disposed in a component element assembly and having external electrodes electrically connected to the internal electrodes and which are disposed on surfaces of the component element assembly,
   wherein the component element assembly comprises a semiconductor ceramic according to claim 4.

7. The semiconductor ceramic powder according to claim 3, characterized in that the donor element is present in an amount of 2 mol or less relative to 100 mols of Ti site elements and the amount of acceptor element is present in an amount of 0.1 to 1 mol relative to 100 mols of Ti site elements.

8. The semiconductor ceramic powder according to claim 7, characterized in that the donor element is present in an amount of 1 mol or less relative to 100 mols of Ti site elements, and the ratio of Sr site elements to Ti site elements is 0.995 to 1.01.

9. The semiconductor ceramic powder according to claim 8, characterized in that the donor element is present in an amount of 0.8 to 1 mol or less relative to 100 mols of Ti site elements, the amount of acceptor element is present in an amount of 0.5 mol relative to 100 mols of Ti site elements, and the ratio of Sr site elements to Ti site elements is 1.00 to 1.01.

10. A semiconductor ceramic which is a sintered semiconductor ceramic powder according to claim 9.

11. The semiconductor ceramic according to claim 10, characterized by having been sintering at a temperature lower than the calcination temperature of the semiconductor ceramic powder.

12. A monolithic semiconductor ceramic capacitor comprising internal electrodes disposed in a component element assembly and having external electrodes electrically connected to the internal electrodes and which are disposed on surfaces of the component element assembly,
wherein the component element assembly comprises a semiconductor ceramic according to claim 10.

13. The semiconductor ceramic powder according to claim 1, characterized in that the acceptor element comprises at least one type of element selected from the group consisting of Mn, Co, Ni, and Cr.

14. A semiconductor ceramic which is a sintered semiconductor ceramic powder according to claim 13.

15. The semiconductor ceramic according to claim 14, characterized by having been sintering at a temperature lower than the calcination temperature of the semiconductor ceramic powder.

16. A monolithic semiconductor ceramic capacitor comprising internal electrodes disposed in a component element assembly and having external electrodes electrically connected to the internal electrodes and which are disposed on surfaces of the component element assembly,
wherein the component element assembly comprises a semiconductor ceramic according to claim 15.

17. A semiconductor ceramic which is a sintered semiconductor ceramic powder according to claim 1.

18. The semiconductor ceramic according to claim 17, characterized by having been sintering at a temperature lower than the calcination temperature of the semiconductor ceramic powder.

19. A monolithic semiconductor ceramic capacitor comprising internal electrodes disposed in a component element assembly and having external electrodes electrically connected to the internal electrodes and which are disposed on surfaces of the component element assembly,
wherein the component element assembly comprises a semiconductor ceramic according to claim 18.

20. A monolithic semiconductor ceramic capacitor comprising internal electrodes disposed in a component element assembly and having external electrodes electrically connected to the internal electrodes and which are disposed on surfaces of the component element assembly,
wherein the component element assembly comprises a semiconductor ceramic according to claim 17.

* * * * *